United States Patent [19]

Koller

[11] Patent Number: 4,880,029

[45] Date of Patent: Nov. 14, 1989

[54] DRAIN VALVE

[75] Inventor: Floyd G. Koller, Dayton, Ohio

[73] Assignee: Auto-Valve, Inc., Montgomery County, Ohio

[21] Appl. No.: 312,748

[22] Filed: Feb. 17, 1989

[51] Int. Cl.⁴ .................. F16K 31/528; F16K 43/00
[52] U.S. Cl. .......................... 137/329.06; 222/501; 251/100; 251/144; 251/287; 251/291
[58] Field of Search ............... 137/315, 329, 329.06, 137/329.01, 329.1, 329.2; 222/501; 251/144, 227, 252, 284, 287, 291, 95, 100

[56] References Cited

U.S. PATENT DOCUMENTS

| | | | |
|---|---|---|---|
| 1,182,375 | 5/1916 | Hutson | 251/100 |
| 1,271,625 | 7/1918 | Snyder | 251/100 |
| 2,569,615 | 10/1951 | Link | 251/100 |
| 3,643,917 | 2/1972 | Griffiths et al. | 137/329.06 |

Primary Examiner—George L. Walton
Attorney, Agent, or Firm—Roger S. Dybvig

[57] ABSTRACT

A push-type, lightning-protected fuel tank drain valve has a non-conductive plastic poppet that cannot be pushed upwardly axially far enough to open its port until the poppet is first rotated about its axis.

4 Claims, 1 Drawing Sheet

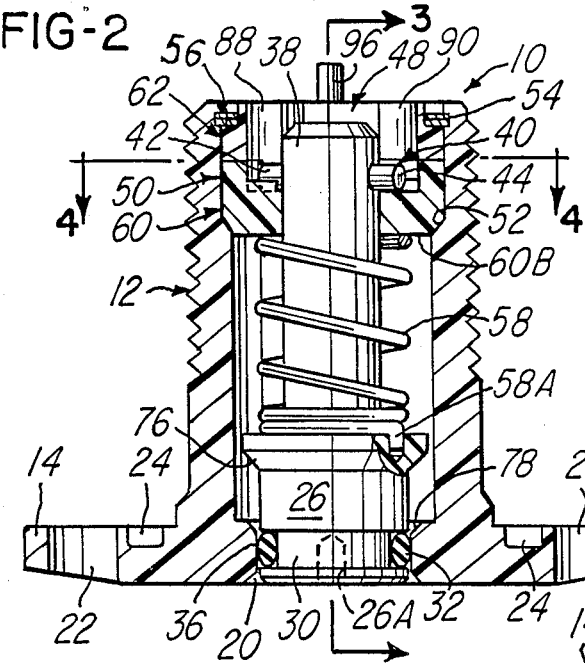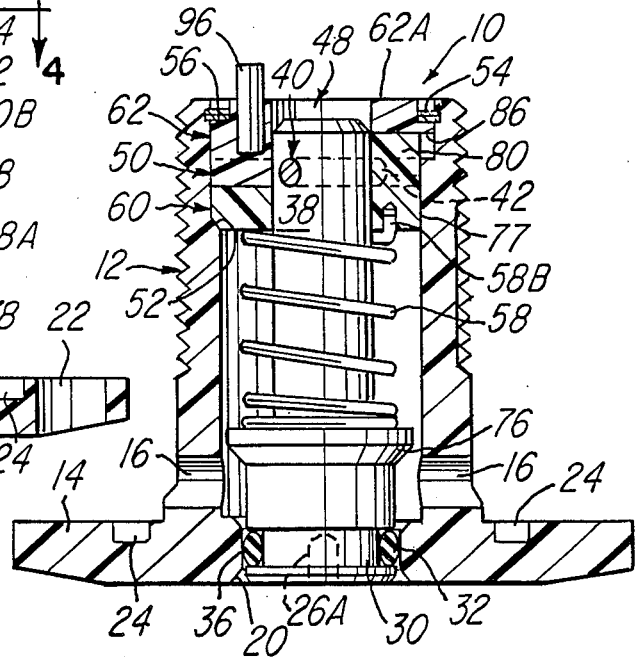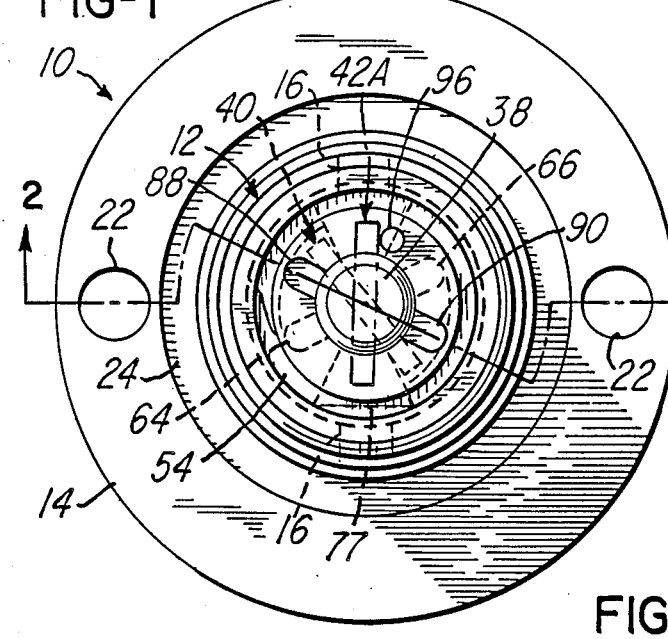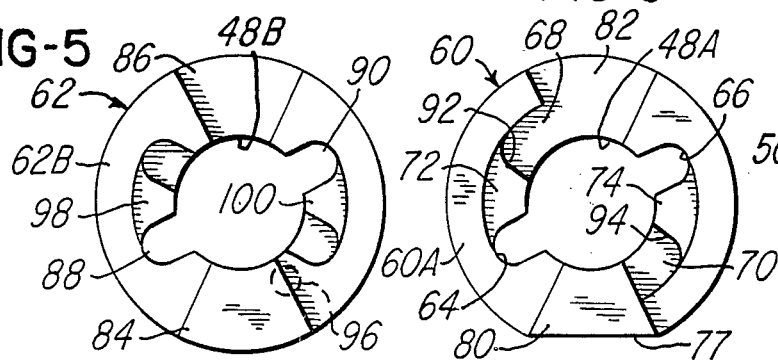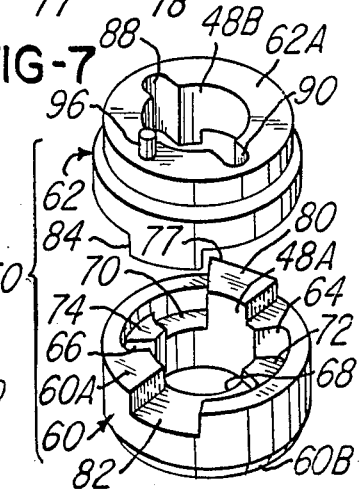

DRAIN VALVE

BACKGROUND OF THE INVENTION

This invention relates to drain valves and, more particularly, to drain valves used in aircraft fuel tanks. However, the valves could also be used for other purposes.

Drain valves are often provided on aircraft fuel tanks so that liquid within the tank, such as water formed from condensated moisture, may be readily removed or drained. Such drain valves typically include a drain port or opening through which the liquid in the tank is drained and a valve member or poppet which moves axially in relation to the port in order to open and close the port. In operation, a preferred form of drain valve has a poppet which is biased to close the port and can be simply pushed inwardly of the fuel tank by use of a screwdriver or other simple tool to open the port. Upon release, the poppet automatically returns to its part-closing position under spring pressure. Examples of such drain valves are shown in Koller, U.S. Pat. No. 3,703,189, and Lipman, U.S. Pat. No. 2,655,932. Another and improved construction is disclosed in Koller et al. U.S. Pat. No. 4,351,355, the disclosure of which is hereby incorporated by reference herein. In the Koller et al. '355 patent, a retainer assembly 52 comprising a pair of interfitting retainer members 58 and 60 has slots for receiving the ends of a pin 40 extending through a valve stem 38 of a poppet or valve member 26. The retainer assembly further has surfaces for supporting the pin 40 and, in turn, the valve member 26 when the valve is either opened or closed. In addition, by rotation of the valve member 26, the pin 40 may be aligned with a slot in one of the retainer members 60 which permits of lowering of the valve member 26 to expose an O-ring sealing member 32 for inspection or replacement. When so lowered, the valve member 26 has a conical valve surface 96 which contacts a beveled valve surface 98 formed on the upper end of the port 20 to provide a temporary seal while the O-ring seal 32 is being inspected or replaced.

It has been recognized that drain valves are subject to being opened as a result of lightning strikes. U.S. Pat. No. 4,437,487 granted March 20, 1984 to Frank E. Marmon mentions that drain valves have been provided with special locks or locking devices to secure the valve in a closed position to protect the valves from lightning strikes and that these require the positive act of a service person. The Marmon '487 patent also discusses the desirability of push-type drain valves which are protected from opening in the event of lightning strikes and proposes a rather complex construction wherein the "blast pressure" of the lightning is allowed to pass through a passage in a piston to allow a closing force to be exerted on the surfaces that close the valve which is greater than the opening force due to a difference in area between the "blast pressure" tending to open the valve and the "blast pressure" tending to close the valve.

Applicant is not informed as to whether or not the drain valve disclosed in the above-mentioned Marmon '487 patent is successfully protected against opening in the event of a lightning strike. Whether it is or not, the need exists for a simple, inexpensive drain valve construction having substantially the advantages of the aforementioned Koller et al. '355 patent which, in addition, is protected against opening in the event of a lightning strike.

SUMMARY OF THE INVENTION

It is the primary object of this invention to provide a simple and inexpensive drain valve which is protected against opening in the event of a lightning strike.

A more specific object of this invention is to provide an improved push-type drain valve assembly which is protected against opening in the event of a lightning strike.

Another object of this invention is to provide an improved drain valve of the type shown in the Koller et al. '355 patent which is protected against opening in the event of a lightning strike. Thus, it is an object of this invention to provide an aircraft drain valve having a poppet or valve member which may be pushed open using a simple tool, which may be held in an open position by rotation of the valve member, which may be automatically returned to the closed position by release of the tool from the valve member, which may be readily partially extended from the valve housing to permit inspection or replacement of its sealing member, and which is protected against opening in the event of a lightning strike.

In accordance with this invention, the drain valve is protected from opening because of a lightning strike by constructing the drain valve with a nonconductive plastic valve member or poppet which cannot be pushed axially far enough to open the port until it is first rotated about its axis. The valve member must be nonconductive because it is not grounded, or at least not well grounded. If it were made of conductive material such as aluminium, it would not only tend to attract lightning strikes, it would also tend to carry the lightning charge into the fuel tank and ignite the fuel. Prevention of axial motion of the valve member is preferably accomplished by providing abutment means fixed relative to the valve housing and stop means fixed relative to the valve member that are in mutually interfering relation when the valve member is in a "home" position wherein the port is closed whereby substantial axial motion of the valve member inwardly of the valve housing is prevented. The abutment means has at least one gap or discontinuity so that rotation of the valve member results in its stop means being positioned out of alignment with the abutment means so that the valve member may be axially pushed inwardly of the housing to open the port without interference with the abutment means.

Further in accordance with a preferred practice of this invention, the poppet or valve member is spring biased to its home position by a combined compression and torsion spring encircling a portion of the valve member and having one end held in fixed relation to the housing and its opposite end held in fixed relation to the valve member. The spring is so constructed that it biases the valve member not only axially to its port-closing position but also rotationally to its home position. As a result, the valve member is automatically returned to its home position when it is released. No special attention on the part of a service person is required to protect the valve member against opening in the event of a lightning strike. Abutment means are also fixed relative to the housing for cooperating with stop means fixed relative to the valve member for limiting the rotation of the valve member and against which the compression/torsion spring biases the valve member in its home position. Another abutment means is preferably provided which limits rotation of the valve member against the rotational bias of the compression/torsion spring so located that when stop means fixed to the valve member engages the last mentioned abutment means, the valve member will be so located that it may be pushed inwardly of the housing to open the valve.

In the preferred practice of this invention, the stop means comprises a pin or rod-like part that extends diametrically through the valve member, transverse to its longitudinal axis, that is adopted to engage both the abutment means that prevents axial movement and the abutment means that limits the rotary movement of the valve member. The same pin also may cooperate with further abutment means that prevents the valve member from extending outwardly of the port.

A drain valve made in accordance with the preferred practice of this invention may be viewed as an improvement of the Koller '355 structure because a pair of interfitting plastic retainer members are used to guide the valve member and also to provide the various above-mentioned abutment means. The drain valve is so contructed that its valve member may be moved to a position wherein it is held open until intentionally closed. Also, the lightning-protected drain valve is preferably so constructed that its valve member may be partly removed from the housing to permit inspection or replacement of its port-sealing member.

The foregoing and other objects and advantages of the present invention will become apparent when taken in conjunction with the following description and the attached drawings.

BRIEF DESCRIPTION OF THE DRAWINGS

FIG. 1 is a top or inner end plan view of a drain valve in accordance with this invention showing the valve closed and including a showing, by phantom lines, of the location of a stop pin connected to the valve member when the valve member is in a "held open" position.

FIG. 2 is a longitudinal sectional view of the drain valve of FIG. 1 taken along line 2—2 thereof.

FIG. 3 is a longitudinal sectional view of the drain valve of FIG. 1 taken along line 3—3 of FIG. 2.

FIG. 4 is a transverse sectional view of the drain valve of FIG. 1 taken along line 4—4 of FIG. 2.

FIG. 5 is a bottom plan view of an upper retainer member forming part of the drain valve of FIG. 1.

FIG. 6 is a top plan view of a lower retainer member forming part of the drain valve of FIG. 1.

FIG. 7 is an exploded perspective view of a retainer assembly formed by the upper and lower retainer members of FIGS. 5 and 6.

DETAILED DESCRIPTION

With reference to FIGS. 1, 2, and 3, a drain valve 10 in accordance with the present invention includes an externally threaded, hollow, tubular housing 12 having an integral lower or base portion 14. As conventional and illustrated, for example, in said Koller U.S. Pat. No. 3,703,189, the drain valve 10 can be fitted onto a fuel tank (not shown) by threading the housing 12 into a mounting nut (also not shown) that is formed or secured on the inside wall of the fuel tank. The mounting nut has a plurality of openings cooperating with openings 16 through the cylindrical housing 12 so that, when the drain valve is opened, liquid from within the tank may flow through a circular drain opening or port 20 at the center of the base portion 14. The base portion 14 has an annular recess 24 for receiving an O-ring sealing member (not shown) in order to seal the base portion 14 at its juncture with the fuel tank. Base portion 14 may also have holes 22 for receiving the lugs of a spanner wrench (not shown).

The drain valve 10 further includes a cylindrical, non-conductive plastic poppet or valve member 26 that moves axially in relation to the drain port 20 to stop the flow of the liquid through the drain port. The valve member 26 includes an annular recess or groove 30 for receiving an O-ring sealing member 32 so that, when the valve member 26 is in a first, home position closing the drain port 20, as shown in FIGS. 2 and 3, the O-ring 32 provides a seal between the valve member 26 and the inside annular wall 36 of the housing 12 that bounds the drain port 20.

An axial valve stem 38 is connected at its lower end to the upper end of the valve member 26, and is preferably formed one-piece therewith. Valve member 26 has a stop pin 40 fixedly connected adjacent its upper end. Ends 42 and 44 of the pin 40 project in a perpendicular direction transverse to the axis of the valve stem 38. When the drain valve 10 is assembled, the valve stem 38 is received in and guided by an axial through-bore 48 of a generally cylindrical retainer assembly, generally designated 50, which is in coaxial relationship with the drain port 20, the valve member 26, and the valve stem 38. As will become apparent, the retainer assembly 50 functions generally to retain the proper position of the valve member 26, the stem 38, and the pin 40.

The retainer assembly 50 is supported upon a shoulder 52 within a large diameter upper portion of the bore of the housing 12 and is fixedly clamped against the shoulder 52 by a retaining ring 54 at the extreme upper end of the housing 12 that bears against an upwardly facing shoulder 56 at the upper end of the retainer assembly 50. For reasons and by means described below, the retainer assembly 50 is nonrotatably mounted within the housing 12.

In accordance with this invention, the valve member 26 is resiliently biased downwardly away from the retainer member 50 by a combined compression and torsion spring 58 coiled around the valve stem 38. The spring 58 has a lower end 58A lodged in a cooperating recess in the upper end of the valve member 26 and an upper end 58B lodged in a cooperating recess in the lower end of the retainer assembly 50. The spring 58 is so constructed that it not only resists compression so that it pushes downwardly on the valve member 26, but also biases the valve member 26 and accordingly its spindle 38 and the stop pin 40 in a clockwise direction as viewed in FIG. 1.

The primary function and operation of the drain valve 10 of this invention is essentially the same as the function and operation of the drain valve 10 shown in the aforementioned Koller U.S. Pat. No. 4,351,355. Thus, the valve member 26 may be selectively located in three different positions, namely: a first, closed position, illustrated in FIGS. 2 and 3 herein, in which the valve member 26 with its O-ring seal 32 closes the port 20; a second, open position, with the valve member 26 elevated away from the port 20; and a third position with the valve member 26 extending sufficiently through the port 20 to expose the O-ring seal for inspection or replacement.

With reference to FIGS. 5, 6, and 7, the retainer assembly 50 comprises two retainer members, a lower retainer member 60 and an upper retainer member 62, both of which may be molded from plastic. The lower retainer member 60, shown in FIGS. 6 and 7, comprises a generally cylindrical, one-piece body member having a generally circular, upwardly facing outer marginal surface 60A, a lower surface 60B, and a cylindrical through-bore 48A that forms the lower end of the through-bore 48 from which extend a pair of diametrically aligned and opposed axial through slots 64 and 66 which are sufficiently large in extent that the projecting stop pin ends 42 and 44 may pass therethrough.

The lower retainer member 60 further has a pair of upwardly facing, diametrically opposed support surface portions 68 and 70 adjacent the through-bore 48 by which the stop pin ends 42 and 44 are supported when the valve member 26 is in the first position shown in FIGS. 2 and 3 closing the port 20. A pair of lands 72 and 74 elevated above the support surfaces 68 and 70 separate, respectively, the through-slot 64 from the support surface 68 and the through-slot 66 from the support surface 70. To enable manipulation of the valve member 26, its exposed lower end face is recessed, as indicated in phantom at 26A in FIGS. 2 and 3 to accomodate a suitable tool, such as a Philips screwdriver, as shown in the aforementioned Koller et al. '355 patent, or an Allen wrench.

In order to reach the third position of the valve member 26, in which its O-ring seal is exposed beneath the base member 14 for inspection or replacement, one may engage the lower end face of the valve member 26 with the appropriate tool, raise the valve member slightly so that it may be rotated without interference from the lands 72 and 74, and then withdraw the tool to permit the valve member 26 to lower under the bias of the spring 58. In the lowered, third position of the valve member 26, a downwardly facing conical valve surface 76 formed on an enlarged upper end portion of the valve member 26, contacts a beveled valve surface 78 formed on the upper end of the port 20. The conical valve surface 76 thus provides a temporary seal at the port 20 while the O-ring seal is being inspected or replaced. At this time, the pin ends 42 and 44 are located within the bottoms of the through-slots 64 and 66 so that the valve member 26 is prevented from rotating under the torsional bias of the spring 58. Accordingly, the spring 58 cannot unwind and the pin 40 remains in proper rotary alignment with the lower retainer member 60.

With reference to FIGS. 3, 4, 6 and 7, the generally cylindrical outer surface of the lower retainer member 60 is interrupted by a flat 77 which cooperates with another flat 78 formed in the bore of the housing 12 to prevent rotation of the lower retainer member 60 relative to the housing 12. The flat 77 is located on a portion of the lower retainer member 60 having an upwardly extending, wedge-shaped projection 80 which is diametrically opposed to a similarly wedge-shaped, upwardly-open recess 82. The upper retainer member 62 has a mating downwardly-projecting, wedge shaped projection 84 and a downwardly-open, wedge-shaped recess 86. When assembled, the projection 80 of the lower retainer member 60 fits within the recess 86 of the upper retainer member 62. Likewise, the projection 86 of the upper retainer member 62 fits within the recess 82 of the lower retainer member 60. Thus, the two retainer members 60 and 62 are maintained in a relative rotary alignment established by the interfitting recesses and projections.

With reference to FIGS. 1, 5, and 7, the upper retainer member 62 has an upper surface 62A, a lower surface 62B, and a through-bore 48B extending therebetween that forms the upper end of the through-bore 48 from which extend a pair of diametrically opposed through-slots 88 and 90 that are provided to enable the pin 40 to pass therethrough so that one may push the valve member 26 upwardly away from the port 20 to open the drain valve 10. In the drain valve disclosed in the aforementioned Koller et al. '355 patent, a pocket was provided in the upwardly facing surface of the lower retainer member therein which was in rotary alignment with the through slots in the upper retainer member so that one could push directly upwardly on the valve member 26 to open the valve. In contrast, when the valve member 26 of this invention is in its first, home position, the torsional bias of the spring 58 causes the pin ends 42 and 44 to be pressed, respectively, against a sidewall of each of the projections 84 and 80. In this position, the pin ends 42 and 44 are not in alignment with the through-slots 88 and 90 of the upper retainer member 62. Rather, they are confined between the upwardly-facing support surfaces 68 and 70 of the lower retainer member 60 and the bottom surface 62B of the upper retainer member 62. The vertical spacing between the latter retainer surfaces is such that upward movement of the pin ends 42 and 44, and correspondingly the valve member 26, sufficient to remove the O-ring 32 from within the port 20 is prevented. As a consequence, in order to open the drain valve 10 of this invention, it is first necessary to rotate the valve member 26 against the torsional bias of the spring 58 in order to align the pin ends 42 and 44 with the through-slots 88 and 90. Conveniently, such alignment is obtained by rotation of the valve member 26 until the stop pin ends 42 and 44 engage, respectively, the sides, designated 92 and 94, respectively, of the lands 72 and 74 confronting the projections 84 and 80, respectively.

After the valve member 26 has been rotated against the torsional bias of the spring 58 to align the stop pin ends 42 and 44 with the through-slots 88 and 90 of the upper retainer member 62, the valve member 26 can then be manually moved axially upwardly so that the pin ends 42 and 44 pass completely through the upper retainer member 62. The O-ring seal 32 of the valve member 26 is thereby moved above the port 20 so that liquid within the fuel tank can drain out the port 20. The valve-open condition can be retained by rotating the valve member 26 in a clockwise direction as viewed in FIG. 1 (which is counterclockwise from the viewpoint of a service person manipulating the valve member 26).

To prevent unwinding of the torsion spring 58, a longitudinally-extending stop pin 96 extends upwardly from the upper surface 62A of the upper retainer 62. The longitudinally-extending stop pin 96 is so located that the transverse stop pin end 42 is urged by the torsional bias of the spring 58 into engagement with the longitudinally-extending stop pin 96 as shown in phantom at 42A in FIG. 1. To return the valve member 26 to its home position, the valve member is reversely rotated against the torsional bias of the spring 58. When such reverse rotation brings the stop pin ends 42 and 44 into alignment with the upper through-slots 88 and 90, the downward bias of the spring 58 causes the valve member 26 to move downwardly, whereupon the tool used to manipulate the valve member 26 can be disengaged therefrom. The valve member 26 will automatically return to its home position under the combined axial and rotational bias of the spring 58.

In FIG. 5, recesses 98 and 100 are shown in the lower surface of the upper retainer member 62. These are of the type required for the lower retainer member in the Koller et al. '355 retainer assembly. They are neither required nor utilized in the practice of the present invention.

Applicant has been advised that a drain valve manufactured in accordance with this invention having a housing, valve member, and retainer members made from glass-filled nylon has been successfully tested, using a standard 200,000 amp test procedure, for protection against opening from lightning strikes. A drain valve made in accordance with the teachings of the Koller et al. '355 patent, but utilizing a non-conductive plastic poppet, would likely pass a less severe 100,000 amp test. To modify such a valve to enable to pass a 200,000 amp test, would require a spring so strong that it would be extremely difficult if not impossible to open it manually. In contrast, the spring 58 of this invention has a relatively low resistance to compression and an even lesser torquing force. Although the range of parameters of usable springs 58 are not known, a spring having a torquing force of only 3.25 pound inches is known to be adequate.

Although the presently preferred embodiment of this invention has been described, it will be understood that within the purview of this invention various changes may be made within the scope of the following claims.

I claim:

1. A lightning-protected fuel drain valve of the type having means forming a non-conductive plastic housing connectable to a fuel tank and having a port opening exteriorly of said housing and said fuel tank, a non-conductive plastic valve member guided for movement along an axis extending through said housing and said port between a first position wherein a lower end portion thereof closes said port and a second position wherein said lower end portion is raised to open said port, bias means operatively engaged with said valve member to bias said valve member in a direction along said axis that would extend said valve member downwardly of said port and said housing, cooperating stop means connected with said valve member for movement therewith and first abutment means fixed relative to said housing for preventing said valve member from passing downwardly out of said port, second abutment means fixed to said housing in confronting relation to said first abutment means and cooperating with said stop means for preventing said valve member from moving upwardly along said axis by a distance sufficient that said outer end portion moves away from said port to open the same unless said valve member is first rotated about said axis to maintain said valve member in a port-closed position in the event of a lightning strike, said bias means comprising a combined compression and torsion spring that torsionally biases said valve member into a position wherein said stop means is in interfering alignment with said first abutment means and in alignment with said second abutment means, and further abutment means cooperating with said stop means for preventing said torsion spring from unwinding when said valve member is in the port-closed position or a port-open position.

2. The drain valve of claim 1 further comprising third abutment means fixed relative to said housing in spaced relation to said first abutment means and spaced upwardly therefrom and engageable by said stop means for holding said valve member in a port-open position, and wherein said further abutment means includes an abutment member projecting upwardly from said third abutment means.

3. The drain valve of claim 2 wherein said valve member is guided for movement along said axis by retainer means having a through bore encompassing said axis through which said stop means may move, said retainer means being axially and rotatably affixed to said housing and providing said first, second, and third abutment means and said further abutment means, said retainer means comprising a pair of retainer members, namely an upper retainer member and a lower retainer member, said lower retainer member having an upwardly facing surface forming said first abutment means, and said upper retainer member having a downwardly facing surface forming said second abutment means and an upwardly facing surface forming said third abutment means 4. The drain valve of claim 3 wherein said abutment member comprises a pin projecting upwardly from said upwardly facing surface of said upper retainer member.

* * * * *

UNITED STATES PATENT AND TRADEMARK OFFICE
CERTIFICATE OF CORRECTION

PATENT NO. : 4,880,029

DATED : November 14, 1989

INVENTOR(S) : Floyd G. Koller

It is certified that error appears in the above-identified patent and that said Letters Patent is hereby corrected as shown below:

On the title page, under item [56], add the following:

--2,665,932   10/1953  .......... Lipman   251/100
  3,698,420   10/1972  .......... Grundy   137/329.06
  3,703,189   11/1972  .......... Koller   137/329.06
  4,351,355    9/1982  .......... Koller   137/329.06
  4,437,487    3,1984  .......... Marmon   251/144

OTHER PUBLICATIONS

Auto-Valve, Inc., August 3, 1978, Drawing No. 68D-5X
Auto-Valve, Inc., June 11, 1986, Drawing No,. 79C10B--

Column 1, line 21, "part" should be --port--.
Column 3, line 22, "tructed" should be --structed--.
Column 4, line 9, "an 5" should be --an--.
Column 5, line 21, "accomodate" should be --accommodate--; line 57, "wedge shaped" should be --wedge-shaped--.
Column 7, line 16, "to" should be --it to--.

UNITED STATES PATENT AND TRADEMARK OFFICE
CERTIFICATE OF CORRECTION

PATENT NO. : 4,880,029

DATED : November 14, 1989

INVENTOR(S) : Floyd G. Koller

It is certified that error appears in the above-identified patent and that said Letters Patent is hereby corrected as shown below:

Column 8, line 41, "means" should be --means.--

Signed and Sealed this

Fifth Day of May, 1992

Attest:

DOUGLAS B. COMER

*Attesting Officer*     *Acting Commissioner of Patents and Trademarks*